(12) United States Patent
Lemay et al.

(10) Patent No.: US 10,102,300 B2
(45) Date of Patent: Oct. 16, 2018

(54) ICON CREATION ON MOBILE DEVICE

(75) Inventors: Steve Lemay, San Francisco, CA (US); Tim Omernick, Mountain View, CA (US); Richard Williamson, Los Gatos, CA (US)

(73) Assignee: APPLE INC., Cupertino, CA (US)

(*) Notice: Subject to any disclaimer, the term of this patent is extended or adjusted under 35 U.S.C. 154(b) by 823 days.

(21) Appl. No.: 11/969,902

(22) Filed: Jan. 6, 2008

(65) Prior Publication Data

US 2009/0178006 A1  Jul. 9, 2009

(51) Int. Cl.
| | | |
|---|---|---|
| G06F 3/00 | (2006.01) | |
| G06F 9/00 | (2006.01) | |
| G06F 17/00 | (2006.01) | |
| G06F 17/30 | (2006.01) | |
| G06F 3/0481 | (2013.01) | |
| G06F 3/0482 | (2013.01) | |

(52) U.S. Cl.
CPC ...... *G06F 17/30884* (2013.01); *G06F 3/0482* (2013.01); *G06F 3/04817* (2013.01)

(58) Field of Classification Search
CPC ........ G06F 9/4443; G06F 8/34; G06F 3/0486; G06F 8/38; G06F 3/04847; G06F 17/30884; G06F 3/04817; G06F 3/0482; H04N 1/00389; H04N 1/00411
USPC ....... 715/762, 763, 764, 765, 864, 865, 747, 715/738, 739
See application file for complete search history.

(56) References Cited

U.S. PATENT DOCUMENTS

| | | |
|---|---|---|
| 5,379,057 A | 1/1995 | Clough et al. |
| 5,483,261 A | 1/1996 | Yasutake |
| 5,488,204 A | 1/1996 | Mead et al. |
| 5,579,472 A | 11/1996 | Keyworth, II et al. |
| 5,675,362 A | 10/1997 | Clough et al. |
| 5,825,352 A | 10/1998 | Bisset et al. |
| 5,835,079 A | 11/1998 | Shieh |
| 5,880,411 A | 3/1999 | Gillespie et al. |
| 5,963,964 A * | 10/1999 | Nielsen ................... 715/255 |
| 6,084,951 A | 7/2000 | Smith |
| 6,188,391 B1 | 2/2001 | Seely et al. |
| 6,310,610 B1 | 10/2001 | Beaton et al. |
| 6,323,846 B1 | 11/2001 | Westerman et al. |
| 6,333,973 B1 | 12/2001 | Smith et al. |
| 6,456,307 B1 * | 9/2002 | Bates et al. ................ 715/838 |
| 6,668,177 B2 | 12/2003 | Salmimaa et al. |

(Continued)

FOREIGN PATENT DOCUMENTS

| | | | |
|---|---|---|---|
| EP | 1327929 | * | 1/2002 |
| JP | 2000-163031 A | | 6/2000 |

(Continued)

OTHER PUBLICATIONS

NetFrontBrowser v3.4, 2006.*

(Continued)

*Primary Examiner* — Kieu Vu
*Assistant Examiner* — Anita D Chaudhuri
(74) *Attorney, Agent, or Firm* — Morrison & Foerster LLP (57) ABSTRACT

An icon associated with content (e.g., webpage content) is created on a mobile device. In one implementation, the content is displayed on the mobile device and an indication is received to create an icon associated with the content. All or a portion of the content is rendered into the icon, and the icon is displayed on a user interface of the mobile device.

28 Claims, 7 Drawing Sheets

(56) References Cited

U.S. PATENT DOCUMENTS

| | | | |
|---|---|---|---|
| 6,690,387 B2 | 2/2004 | Zimmerman et al. | |
| 6,791,583 B2 | 9/2004 | Tang et al. | |
| 6,895,552 B1* | 5/2005 | Balabanovic et al. | 715/209 |
| 6,934,911 B2 | 8/2005 | Salmimaa et al. | |
| 6,992,687 B1* | 1/2006 | Baird et al. | 715/805 |
| 7,015,894 B2 | 3/2006 | Morohoshi | |
| 7,184,064 B2 | 2/2007 | Zimmerman et al. | |
| 7,212,808 B2 | 5/2007 | Eengstrom et al. | |
| 7,213,206 B2 | 5/2007 | Fogg | |
| 7,218,943 B2 | 5/2007 | Klassen et al. | |
| 7,283,839 B2 | 10/2007 | You et al. | |
| 7,346,850 B2 | 3/2008 | Swartz et al. | |
| 7,360,172 B2 | 4/2008 | Grossman et al. | |
| 7,433,920 B2 | 10/2008 | Blagsvedt et al. | |
| 7,663,607 B2 | 2/2010 | Hotelling et al. | |
| 7,913,192 B2 | 3/2011 | Dicke et al. | |
| 7,974,391 B2 | 7/2011 | Drewry et al. | |
| 8,233,885 B2 | 7/2012 | Kansal et al. | |
| 8,320,528 B2 | 11/2012 | Diroo et al. | |
| 8,320,547 B2 | 11/2012 | Cho et al. | |
| 8,479,122 B2 | 7/2013 | Hotelling et al. | |
| 2002/0115476 A1* | 8/2002 | Padawer et al. | 455/564 |
| 2003/0064756 A1* | 4/2003 | Nielsen et al. | 455/566 |
| 2004/0137884 A1 | 7/2004 | Engstrom et al. | |
| 2005/0084450 A1 | 4/2005 | Hattori et al. | |
| 2005/0091272 A1 | 4/2005 | Smith et al. | |
| 2005/0160369 A1* | 7/2005 | Balabanovic et al. | 715/766 |
| 2005/0216526 A1* | 9/2005 | Kumagai | 707/201 |
| 2005/0245281 A1 | 11/2005 | You et al. | |
| 2006/0026521 A1 | 2/2006 | Hotelling et al. | |
| 2006/0084450 A1 | 4/2006 | Dam Nielsen | |
| 2006/0097991 A1 | 5/2006 | Hotelling et al. | |
| 2006/0101350 A1 | 5/2006 | Scott | |
| 2006/0171515 A1* | 8/2006 | Hintermeister et al. | 379/110.01 |
| 2006/0197753 A1 | 9/2006 | Hotelling | |
| 2006/0270419 A1 | 11/2006 | Crowley et al. | |
| 2006/0277460 A1* | 12/2006 | Forstall et al. | 715/513 |
| 2007/0035513 A1 | 2/2007 | Sherrard et al. | |
| 2007/0047697 A1 | 3/2007 | Drewry et al. | |
| 2007/0060206 A1 | 3/2007 | Dam Nielsen et al. | |
| 2007/0128899 A1* | 6/2007 | Mayer | 439/152 |
| 2007/0129112 A1 | 6/2007 | Tarn | |
| 2007/0156492 A1* | 7/2007 | Hawkins et al. | 705/8 |
| 2007/0271367 A1 | 11/2007 | Yardeni et al. | |
| 2007/0271527 A1 | 11/2007 | Paas et al. | |
| 2007/0280457 A1 | 12/2007 | Aberethy et al. | |
| 2008/0055273 A1* | 3/2008 | Forstall | 345/173 |
| 2008/0059627 A1 | 3/2008 | Hamalainen et al. | |
| 2008/0125178 A1 | 5/2008 | Park et al. | |
| 2008/0132243 A1 | 6/2008 | Spalink et al. | |
| 2008/0132251 A1 | 6/2008 | Altman et al. | |
| 2008/0133336 A1 | 6/2008 | Altman et al. | |
| 2008/0153459 A1 | 6/2008 | Kansal et al. | |
| 2008/0161045 A1 | 7/2008 | Vuorenmas | |
| 2008/0162504 A1 | 7/2008 | Rentto et al. | |
| 2008/0220752 A1 | 9/2008 | Forstall et al. | |
| 2008/0222531 A1 | 9/2008 | Davidson et al. | |
| 2008/0282196 A1* | 11/2008 | Park | 715/838 |
| 2008/0301555 A1* | 12/2008 | Vartiainen et al. | 715/704 |
| 2009/0164923 A1 | 6/2009 | Ovi | |
| 2009/0178006 A1 | 7/2009 | Lemay et al. | |
| 2010/0011304 A1 | 1/2010 | Van Os | |

FOREIGN PATENT DOCUMENTS

| | | | |
|---|---|---|---|
| JP | 2002-342033 A | | 11/2002 |
| JP | 2006-195592 A | | 7/2006 |
| WO | WO02088996 | * | 4/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Nov. 1, 2011, for U.S. Appl. No. 12/170,295, filed Jul. 9, 2008, 15 pages.

Final Office Action dated Jan. 31, 2013, for U.S. Appl. No. 12/170,295, filed Jul. 9, 2008, 19 pages.

Final Office Action dated Dec. 20, 2013, for U.S. Appl. No. 12/170,295, filed Jul. 9, 2008, 18 pages.

iPhone Matters (Jan. 9, 2008). Located at http://www.iphonematters.com/article/my_iphone_wish_phone_contact_home_screen_icons_392/, last viewed on Nov. 17, 2008, 3 pages.

Non-Final Office Action dated Dec. 27, 2010, for U.S. Appl. No. 12/170,295, filed Jul. 9, 2008, 11 pages.

Non-Final Office Action dated Jun. 21, 2012, for U.S. Appl. No. 12/170,295, filed Jul. 9, 2008, 18 pages.

Non-Final Office Action dated Jun. 21, 2013, for U.S. Appl. No. 12/170,295, filed Jul. 9, 2008, 25 pages.

Non-Final Office Action dated Jun. 20, 2014, for U.S. Appl. No. 12/170,295, filed Jul. 9, 2008, 15 pages.

* cited by examiner

ICON CREATION ON MOBILE DEVICE

TECHNICAL FIELD

The subject matter of this patent application is generally related to mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, a browser to surf the Internet, etc. Modern mobile devices can include two or more of these applications. The applications can be represented on a user interface of the mobile device by icons.

Some modern mobile devices include browsers for searching and accessing web content. These browsers often include book marking capability so that a user can bookmark a Uniform Resource Locator (URL) of a webpage of interest to revisit later. While book marking is useful, bookmarked URLs can look similar which can confuse the user and diminish the usefulness of book marking.

SUMMARY

An icon associated with content (e.g., webpage content) is created on a mobile device. In one implementation, the content is displayed on the mobile device and an indication is received to create an icon associated with the content. All or a portion of the content is rendered into the icon, and the icon is displayed on a user interface of the mobile device.

In some implementations, a method includes: displaying content on a mobile device; receiving an indication to create an icon associated with the content; converting a portion of the content into the icon; and displaying the icon on a user interface of the mobile device.

In some implementations, a method includes: displaying content of a webpage on a mobile device; receiving a first indication to associate a bookmark with the webpage, email the webpage, or create an icon associated with the webpage; upon receiving a second indication to create the icon, displaying a virtual keyboard on the mobile device; receiving a third indication from the virtual keyboard specifying a name associated with the webpage; determining a portion of the content to convert into the icon; and displaying the icon on a user interface of the mobile device.

Other implementations are disclosed which are directed to systems, methods and computer-readable mediums.

DETAILED DESCRIPTION

Icon Creation

Figure 1:
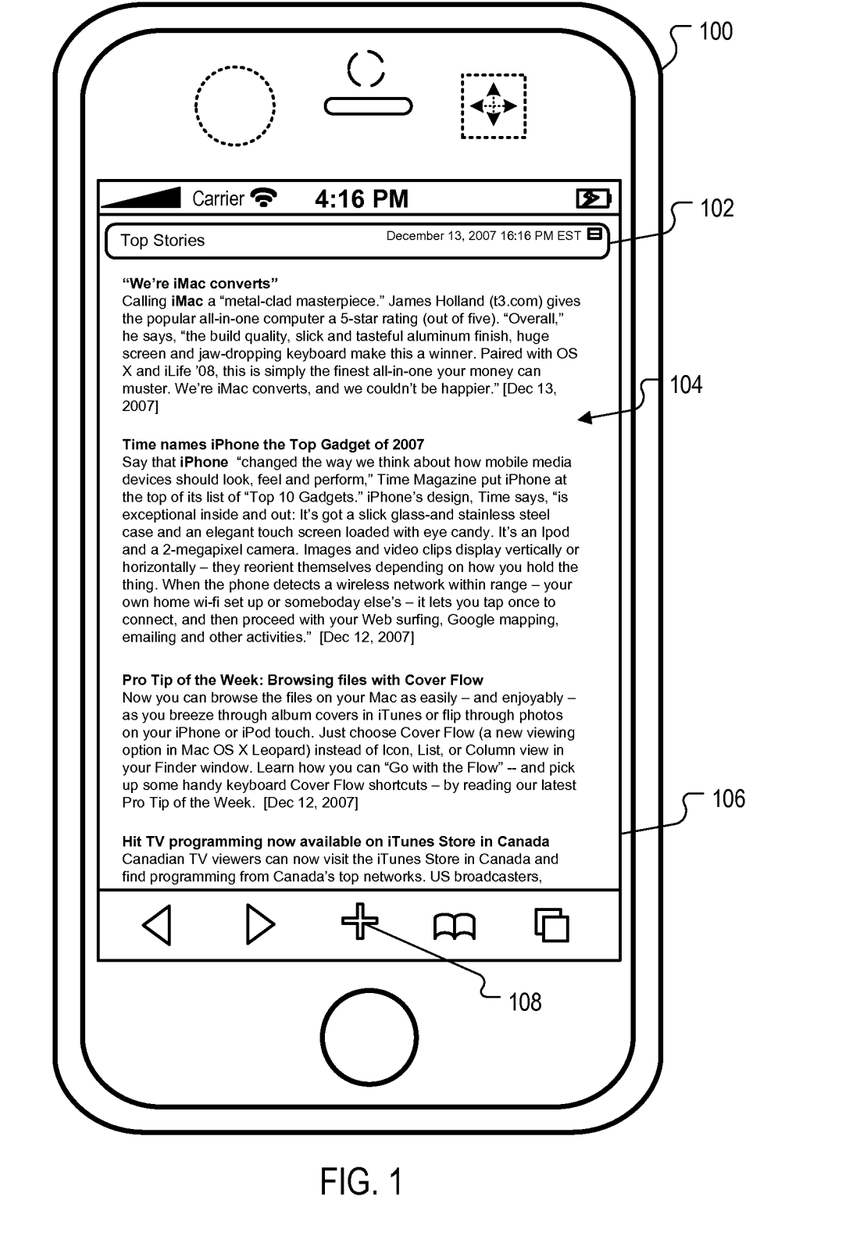
FIG. 1 is a block diagram of an example mobile device displaying content of a webpage.

FIG. 1 shows an example portable device 100. For example, the portable device 100 can be a cellular phone, a personal digital assistant (PDA), or a portable media device (e.g., a portable MPEG-1 Audio Layer 3 (MP3) player, a portable DVD player, etc.). Some examples of the portable device 100 may be an iPhone™ or an iPod™ of Apple Inc. in Cupertino, Calif. In one implementation, the portable device 100 includes a touch screen display that displays content of a webpage 102.

Various software applications can be executed by the portable device 100, as will be described below with reference to FIG. 5. In the depicted example, the portable device 100 is executing an Internet browser application. For example, a user can use the browser application to access one or more webpages through a network, such as the Internet.

The user can use a virtual keyboard, as will be described later, to input a URL for a webpage. As shown, the content 104 of the webpage 102 is displayed for the user on the mobile device. In one implementation, the user may decide to interact with the webpage 102 in a variety of ways. For example, the user may decide to email the webpage 102 to a friend, or to create a bookmark of the webpage 102 in order to access the webpage later. In one implementation, the user can create an icon associated with the webpage 102 and have the icon readily accessible on a user interface associated with the mobile device 100 (as will be described further below). The icon can, for example, include an image with text that is a link to the webpage 102. The icon can invoke a corresponding object environment and functionality. For example, the icon can invoke a browser to display the webpage 102 associated with the icon.

In one implementation, the mobile device 100 can receive an indication from a user that wants to interact with the webpage 102. The indication can, for example, be received using a touch screen 106 of the mobile device 100. The touch screen 106, as will be described below, can detect touch and gestures using touch sensitivity technologies.

In one implementation, the mobile device 100 can receive an indication of the user pressing a user interface element (e.g., a symbol) on the touch screen 106. In the example shown, the user interface element is a symbol 108 which can, for example, include a plus symbol indicating that the user wants to either associate a bookmark with the webpage 102, email the webpage 102, or create an icon associated with the webpage 102. In one implementation, the symbol 108 is presented proximate to the content of the webpage 102. In the example on FIG. 1, the symbol 108 is presented below the content of the webpage 102.

Example Options Pane

Figure 2:
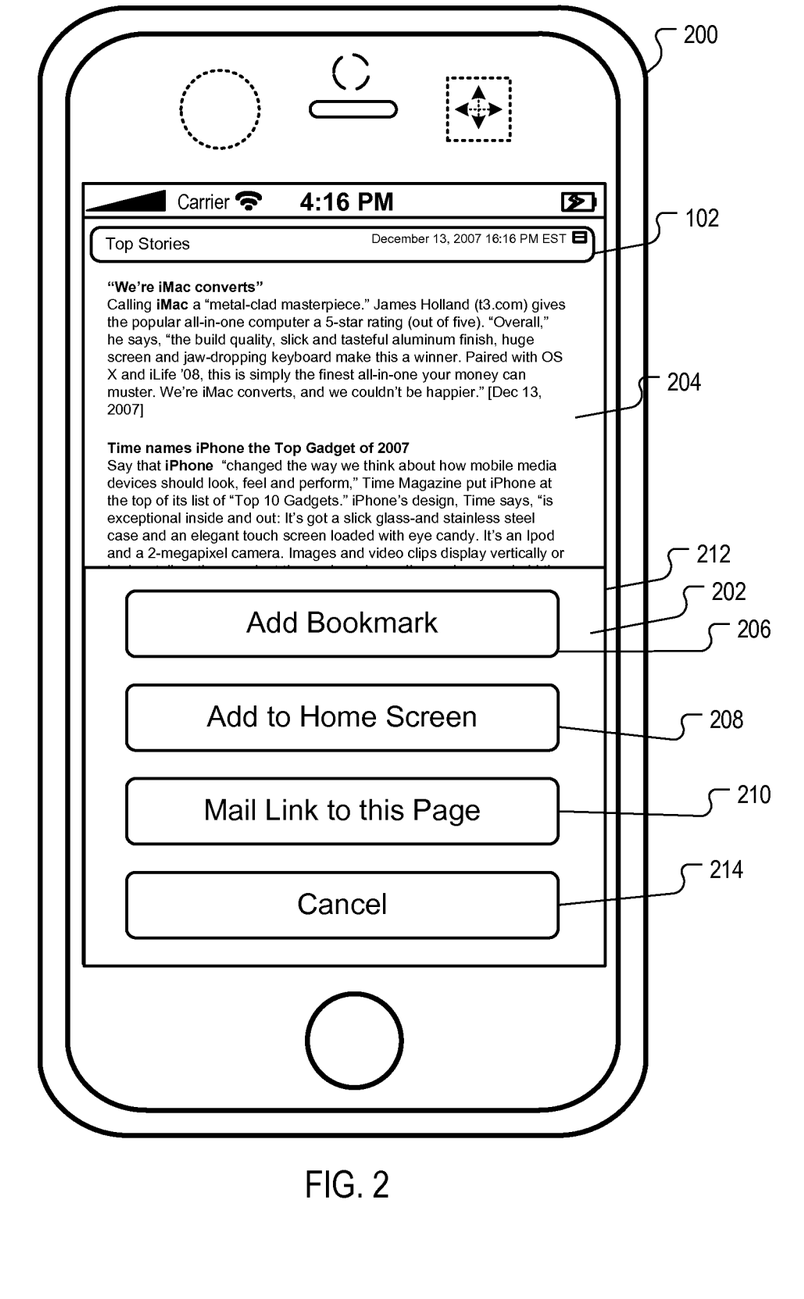
FIG. 2 is a block diagram of an example of a mobile device allowing for an icon to be created for the content.

FIG. 2 is a block diagram of an example mobile device 200 depicting an icon creation functionality. In one implementation, upon receiving an indication of the symbol 108, an options pane 202 is presented on top of the webpage 102. In one implementation, the pane 202 can for example, include a semi-transparent portion 204 so that the webpage content 104 can still be seen behind the pane 202.

In one implementation, the option pane 202 presents one or more options to the user. For example, the display 202 can allow for the webpage 102 to be bookmarked 206, added to the home screen 208, or emailed 210. The user can tap the touch screen 212 to select one of the options "Add Bookmark" 206, "Add to Home Screen" 208, or "Mail Link to this Page" 210. The user can also select a "cancel" 214 option if he/she decides not to select one of the three options.

In one implementation, adding the webpage 102 to the home screen 208 includes creating an icon associated with the webpage 102 so that a user can click on the icon on the user interface of the mobile device and be directed to the webpage 102.

In one implementation, upon receiving the indication of adding to the home screen 208, a portion of the content associated with the webpage 102 can be converted into an icon. For example, a top portion of the content can be copied, and reduced in size, and converted into an icon, as will be shown in FIG. 3. In some implementations, a bottom portion of the content can be converted into the icon. In still other implementations, the entire content can be converted into an icon.

In one implementation, at least half of the screen containing the content is converted into the icon. In other implementations, a square size of the content is converted into the icon. The square size can, for example, be determined by the width of the screen.

Example Interface for Naming Icons

Figure 3:
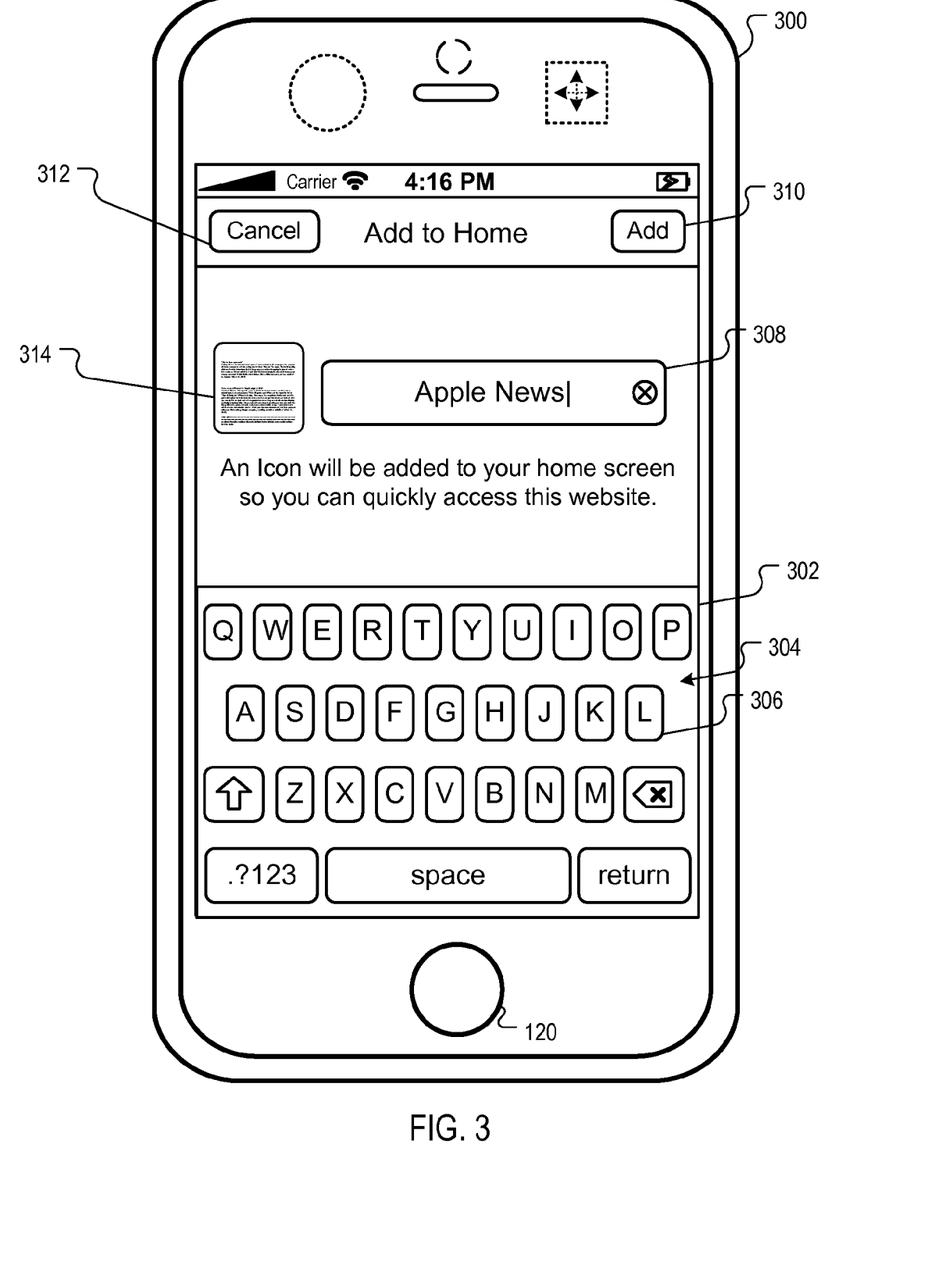
FIG. 3 is a block diagram of an example mobile device including a process for creating an icon.

FIG. 3 is a block diagram of an example mobile device 300 depicting a virtual keyboard 302 used in creating an icon associated with the webpage 102. The virtual keyboard 302 includes buttons or keys 304. In one example, the user can select a character by tapping a key on the virtual keyboard 302 that corresponds to the character.

In one implementation, the user uses the virtual keyboard 304 to input text for the name of the icon to add to the user interface of the mobile device 300. As shown, the mobile device 300 includes a text input box 308 for receiving text input by the user. For example, the user can input text for an icon name by selecting characters from the virtual keyboard 304. After inputting the name, the user can select an add button 310 to add the icon to the user interface of the mobile device 300, which in this example is shown as icon 554 in FIG. 5. The icon 554 includes the name input "Apple News" created using the virtual keyboard 304. The user can also select a cancel button 312 if the user decides not to create an icon to be placed onto the user interface of the mobile device 300.

In one implementation, the user can also be presented with a preview of the icon 314 that will be displayed on the user interface along with the name created by the user. The icon 314 can, for example, represent a portion of the webpage 102. In this example, the top half of the web page content 104 was selected from the webpage 102 and rendered into a rendering process. Suitable processes for rendering icons from content are available through application programming interfaces (APIs) of known image processing tools, such as Icon Composer distributed as part of Apple Inc.'s Mac OS X operating system. In some implementations, the user can select a portion of content to be rendered into an icon using a selection tool (e.g., a sizable bounding box). A tool for selecting web content is described in U.S. patent application Ser. No. 11/145,560, for "WebView Applications," which patent application is incorporated by reference herein in its entirety.

Example Icon Creation Process

Figure 4:
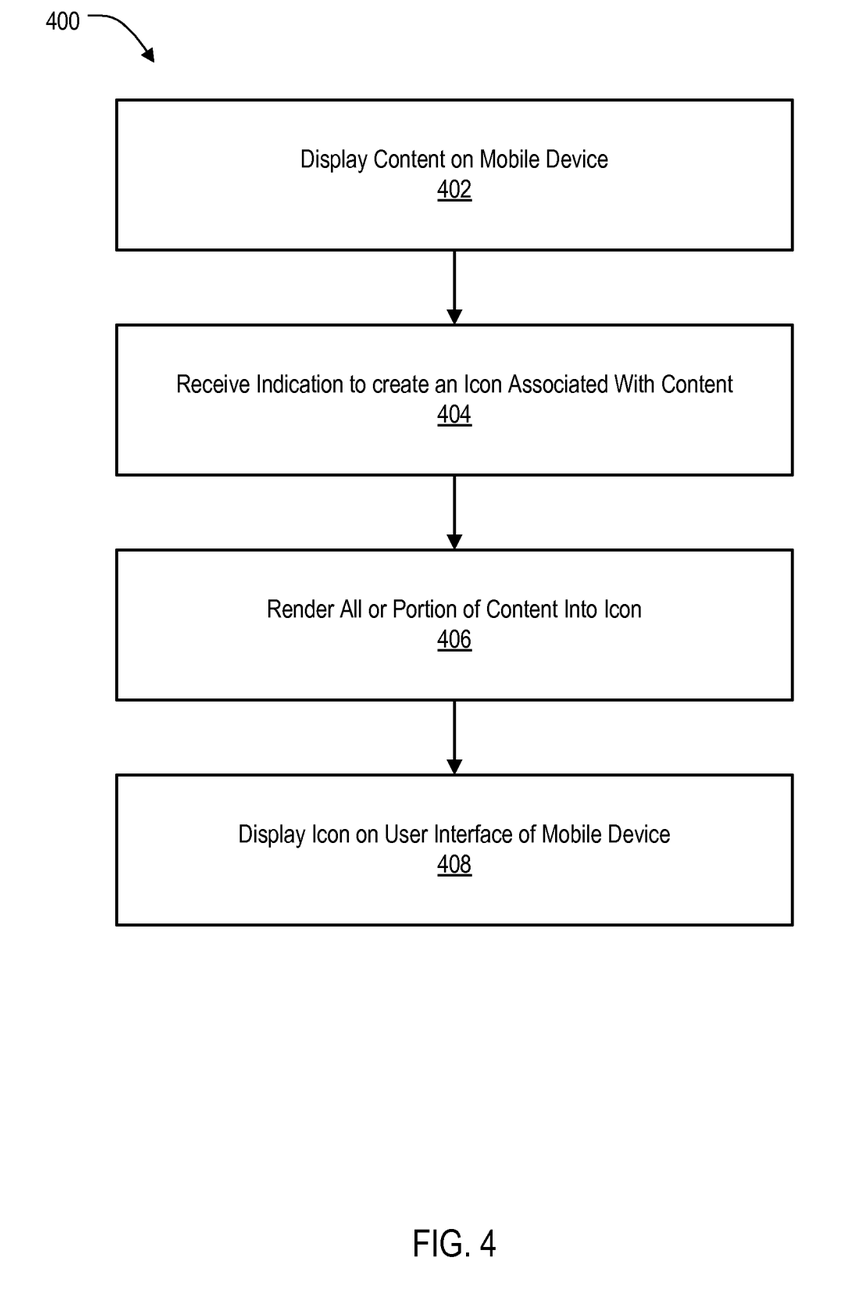
FIG. 4 is a flow diagram of a process for creating icons for content.

FIG. 4 is a flow diagram of a process 400 for creating an icon for content displayed on a mobile device. The process 400 begins when content of a webpage is displayed on the mobile device (402). The content can be included in a webpage that is navigated to by a user using, for example, a browser.

An indication to create an icon associated with the webpage is received (404). The indication can be through the user selecting a user interface element that is presented proximate to the webpage content. The indication can then present an option pane to the user where the user can select an option to create an icon associated with the webpage. A portion of the content is rendered into the icon (406). In one implementation, the portion of the content to be rendered into the icon maybe captured as an image such as a bitmap and then scaled to fit the dimensions of the icon if such scaling is necessary to fit the dimensions of the icon. In another embodiment text within the portion of the content may be captured and used to generate the image or visual content of the icon. The portion can include, for example, the top half portion of the content. The icon is displayed on a user interface of the mobile device (408).

Mobile Device Overview

Figure 5:
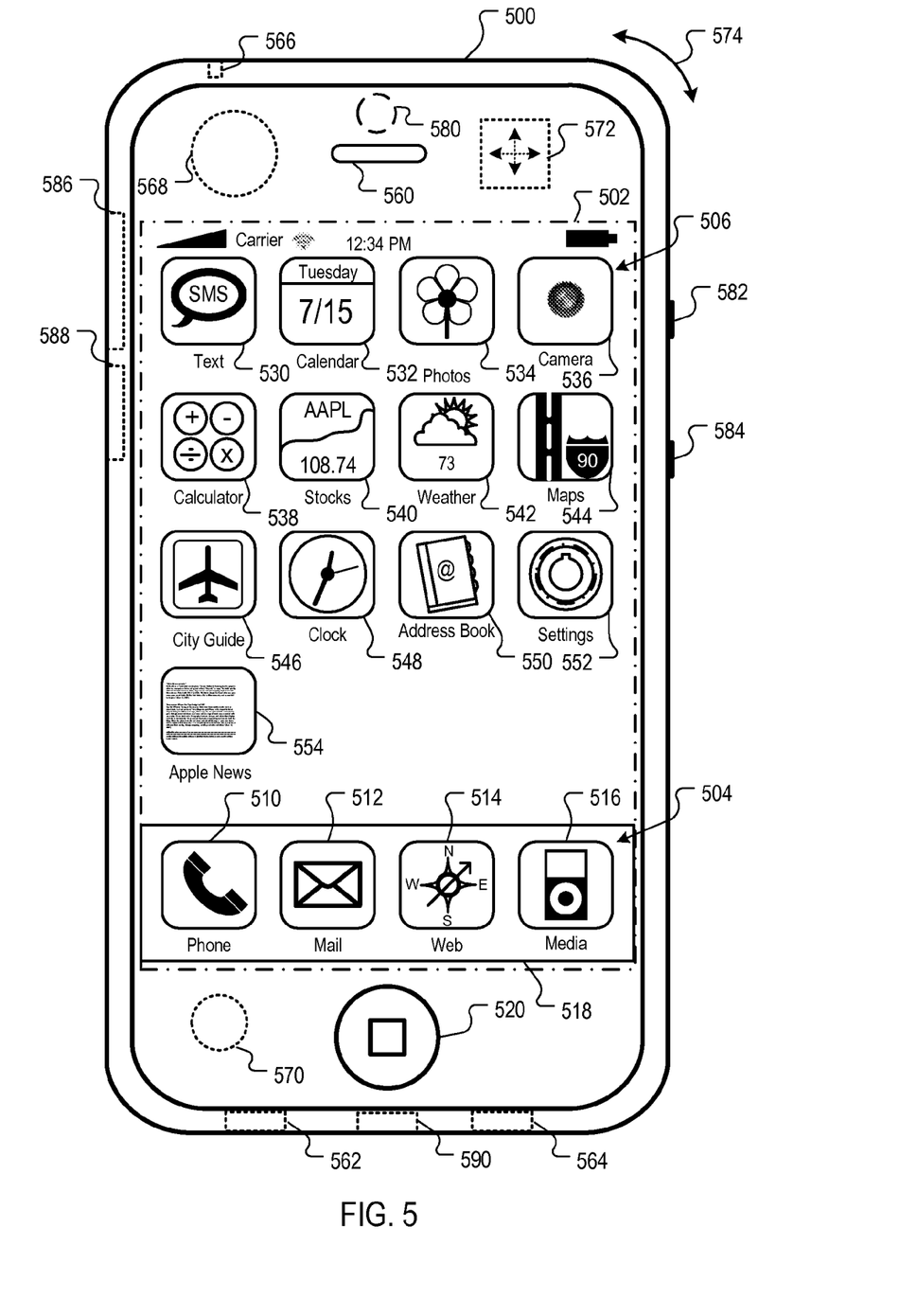
FIG. 5 is a block diagram of an example of a mobile device user interface including a newly created icon.

FIG. 5 is a block diagram of an example mobile device. In some implementations, the mobile device 500 includes a touch-sensitive display 502. The touch-sensitive display 502 can implement liquid crystal display (LCD) technology, light emitting polymer display (LPD) technology, or some other display technology. The touch-sensitive display 502 can be sensitive to haptic and/or tactile contact with a user.

In some implementations, the touch-sensitive display 502 can comprise a multi-touch-sensitive display 502. A multi-touch-sensitive display 502 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323, 846, 6,570,557, 6,677,932, and U.S. Patent Publication 2002/0015024A1, each of which is incorporated by reference herein in its entirety.

In some implementations, the mobile device 500 can display one or more graphical user interfaces on the touch-sensitive display 502 for providing the user access to various system objects and for conveying information to the user. In some implementations, the graphical user interface can include one or more display objects 504, 506. In the example shown, the display objects 504, 506, are graphic representations of system objects. Some examples of system objects include device functions, applications, windows, files, alerts, events, or other identifiable system objects.

Example Mobile Device Functionality

In some implementations, the mobile device 500 can implement multiple device functionalities, such as a telephony device, as indicated by a phone object 510; an e-mail device, as indicated by the e-mail object 512; a network data communication device, as indicated by the Web object 514; a Wi-Fi base station device (not shown); and a media processing device, as indicated by the media player object 516. In some implementations, particular display objects 504, e.g., the phone object 510, the e-mail object 512, the Web object 514, and the media player object 516, can be displayed in a menu bar 518. In some implementations, device functionalities can be accessed from a top-level graphical user interface, such as the graphical user interface illustrated in FIG. 5. Touching one of the objects 510, 512, 514 or 516 can, for example, invoke corresponding functionality.

In some implementations, the mobile device 500 can implement network distribution functionality. For example, the functionality can enable the user to take the mobile device 500 and its associated network while traveling. In particular, the mobile device 500 can extend Internet access (e.g., Wi-Fi) to other wireless devices in the vicinity. For example, mobile device 500 can be configured as a base station for one or more devices. As such, mobile device 500 can grant or deny network access to other wireless devices.

In some implementations, upon invocation of device functionality, the graphical user interface of the mobile device 500 changes, or is augmented or replaced with another user interface or user interface elements, to facilitate user access to particular functions associated with the corresponding device functionality. For example, in response to a user touching the phone object 510, the graphical user interface of the touch-sensitive display 502 may present display objects related to various phone functions; likewise, touching of the email object 512 may cause the graphical user interface to present display objects related to various e-mail functions; touching the Web object 514 may cause the graphical user interface to present display objects related to various Web-surfing functions; and touching the media player object 516 may cause the graphical user interface to present display objects related to various media processing functions.

In some implementations, the top-level graphical user interface environment or state of FIG. 5 can be restored by pressing a button 520 located near the bottom of the mobile device 500. In some implementations, each corresponding device functionality may have corresponding "home" display objects displayed on the touch-sensitive display 502, and the graphical user interface environment of FIG. 5 can be restored by pressing the "home" display object.

In some implementations, the top-level graphical user interface can include additional display objects 506, such as a short messaging service (SMS) object 530, a calendar object 532, a photos object 534, a camera object 536, a calculator object 538, a stocks object 540, a weather object 542, a maps object 544, a city guide object 546, a clock object 548, an address book object 550, a settings object 552, and a user created icon 554. Touching the user created icon 554 can, for example, invoke an Internet environment and supporting functionality and display the webpage associated with the icon 554; likewise, each selection of a display object 530, 532, 534, 536, 538, 540, 542, 544, 546, 548, 550, and 552 can invoke a corresponding object environment and functionality.

Additional and/or different display objects can also be displayed in the graphical user interface of FIG. 5. For example, if the device 500 is functioning as a base station for other devices, one or more "connection" objects may appear in the graphical user interface to indicate the connection. In some implementations, the display objects 506 can be configured by a user, e.g., a user may specify which display objects 506 are displayed, and/or may download additional applications or other software that provides other functionalities and corresponding display objects.

In some implementations, the mobile device 500 can include one or more input/output (I/O) devices and/or sensor devices. For example, a speaker 560 and a microphone 562 can be included to facilitate voice-enabled functionalities, such as phone and voice mail functions. In some implementations, a loud speaker 564 can be included to facilitate hands-free voice functionalities, such as speaker phone functions. An audio jack 566 can also be included for use of headphones and/or a microphone.

In some implementations, a proximity sensor 568 can be included to facilitate the detection of the user positioning the mobile device 500 proximate to the user's ear and, in response, to disengage the touch-sensitive display 502 to prevent accidental function invocations. In some implementations, the touch-sensitive display 502 can be turned off to conserve additional power when the mobile device 500 is proximate to the user's ear.

Other sensors can also be used. For example, in some implementations, an ambient light sensor 570 can be utilized to facilitate adjusting the brightness of the touch-sensitive display 502. In some implementations, an accelerometer 572 can be utilized to detect movement of the mobile device 500, as indicated by the directional arrow 574. Accordingly, display objects and/or media can be presented according to a detected orientation, e.g., portrait or landscape. In some implementations, the mobile device 500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 500 or provided as a separate device that can be coupled to the mobile device 100 through an interface (e.g., port device 590) to provide access to location-based services.

The mobile device 500 can also include a camera lens and sensor 580. In some implementations, the camera lens and sensor 580 can be located on the back surface of the mobile device 500. The camera can capture still images and/or video.

The mobile device 500 can also include one or more wireless communication subsystems, such as an 802.11b/g communication device 586, and/or a Bluetooth™ communication device 588. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 590, e.g., a Universal Serial Bus (USB) port, or a docking port, or some other wired port connection, can be included. The port device 590 can, for example, be utilized to establish a wired connection to other computing devices, such as other communication devices 500, network access devices, a personal computer, a printer, or other processing devices capable of receiving and/or transmitting data. In some implementations, the port device 590 allows the mobile device 500 to synchronize with a host device using one or more protocols, such as, for example, the TCP/IP, HTTP, UDP and any other known protocol.

Example Network Operating Environment

Figure 6:
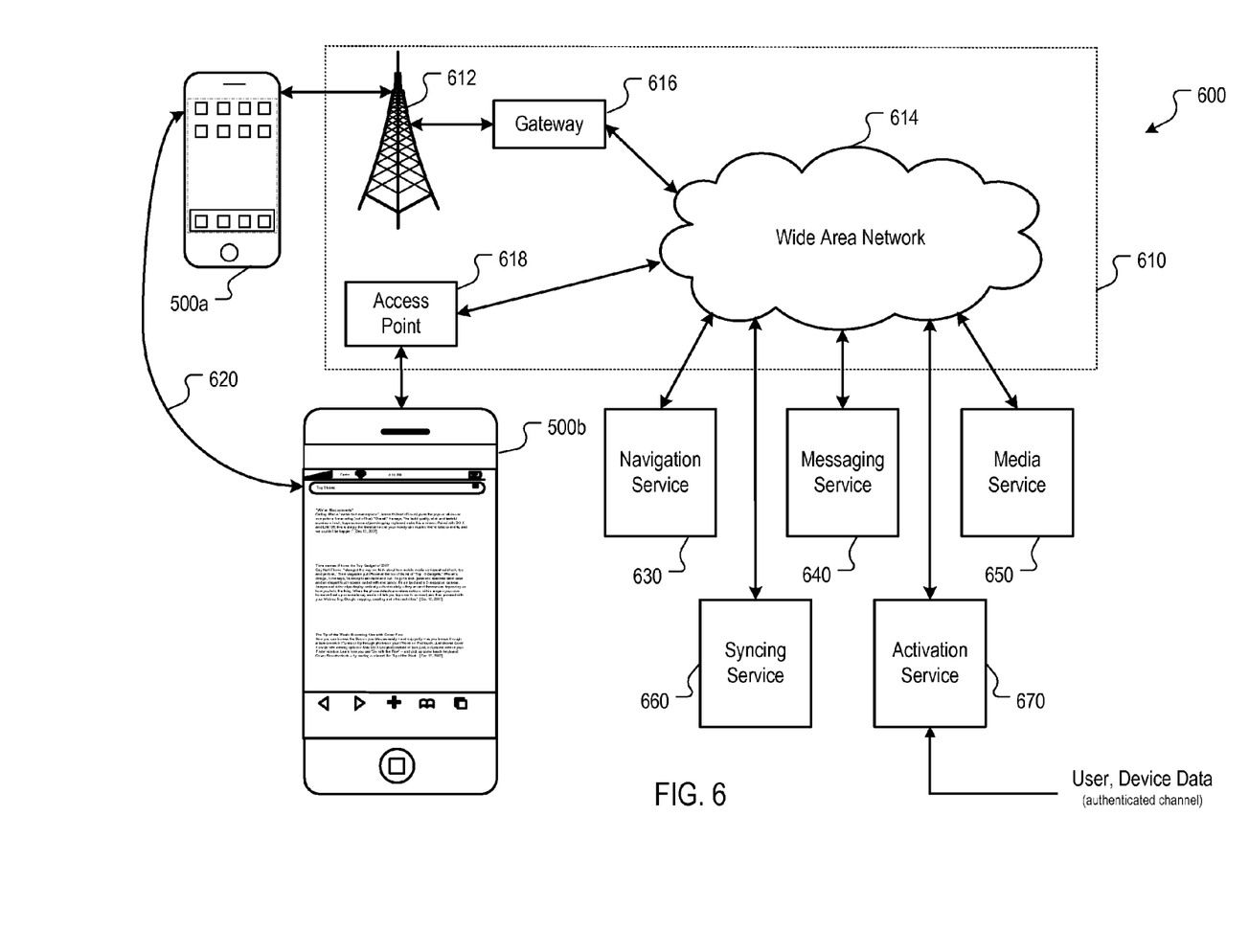
FIG. 6 is a block diagram of an example network operating environment for the mobile device of FIG. 5.

FIG. 6 is a block diagram of an example network operating environment 600 for the mobile device 500 of FIG. 5.

The mobile device 500 of FIG. 5 can, for example, communicate over one or more wired and/or wireless networks 210 in data communication. For example, a wireless network 612, e.g., a cellular network, can communicate with a wide area network (WAN) 614, such as the Internet, by use of a gateway 616. Likewise, an access point 618, such as an 802.11g wireless access point, can provide communication access to the wide area network 614. In some implementations, both voice and data communications can be established over the wireless network 612 and the access point 618. For example, the mobile device 500a can place and receive phone calls (e.g., using VoIP protocols), send and receive e-mail messages (e.g., using POP3 protocol), and retrieve electronic documents and/or streams, such as web pages, photographs, and videos, over the wireless network 612, gateway 616, and wide area network 614 (e.g., using TCP/IP or UDP protocols). Likewise, the mobile device 500b can place and receive phone calls, send and receive e-mail messages, and retrieve electronic documents over the access point 618 and the wide area network 614. In some implementations, the mobile device 500 can be physically connected to the access point 618 using one or more cables and the access point 618 can be a personal computer. In this configuration, the mobile device 500 can be referred to as a "tethered" device.

The mobile devices 500a and 500b can also establish communications by other means. For example, the wireless device 500a can communicate with other wireless devices, e.g., other wireless devices 100, cell phones, etc., over the wireless network 612. Likewise, the mobile devices 500a and 500b can establish peer-to-peer communications 620, e.g., a personal area network, by use of one or more communication subsystems, such as the Bluetooth™ communication device 588 shown in FIG. 5. Other communication protocols and topologies can also be implemented.

The mobile device 100 can, for example, communicate with one or more services 630, 640, 650, 660, and 670 over the one or more wired and/or wireless networks 610. For example, a navigation service 630 can provide navigation information, e.g., map information, location information, route information, and other information, to the mobile device 100.

A messaging service 640 can, for example, provide e-mail and/or other messaging services. A media service 650 can, for example, provide access to media files, such as song files, movie files, video clips, and other media data. A syncing service 660 can, for example, perform syncing services (e.g., sync files). An activation service 670 can, for example, perform an activation process 500 for activating the mobile device 500, as described in reference to FIG. 5. Other services can also be provided, including a software update service that automatically determines whether software updates exist for software on the mobile device 500, then downloads the software updates to the mobile device 500 where it can be manually or automatically unpacked and/or installed.

The mobile device 500 can also access other data and content over the one or more wired and/or wireless networks 610. For example, content publishers 670, such as news sites, RSS feeds, web sites, blogs, social networking sites, developer networks, etc., can be accessed by the mobile device 500. Such access can be provided by invocation of a web browsing function or application (e.g., a browser) in response to a user touching the Web object 514. In the example shown, a user of the mobile device 500b has invoked an icon functionality, e.g., by pressing the icon object 554 on the top-level graphical user interface shown in FIG. 5, and has requested and received the webpage associated with the "Apple News" icon.

Example Mobile Device Architecture

Figure 7:
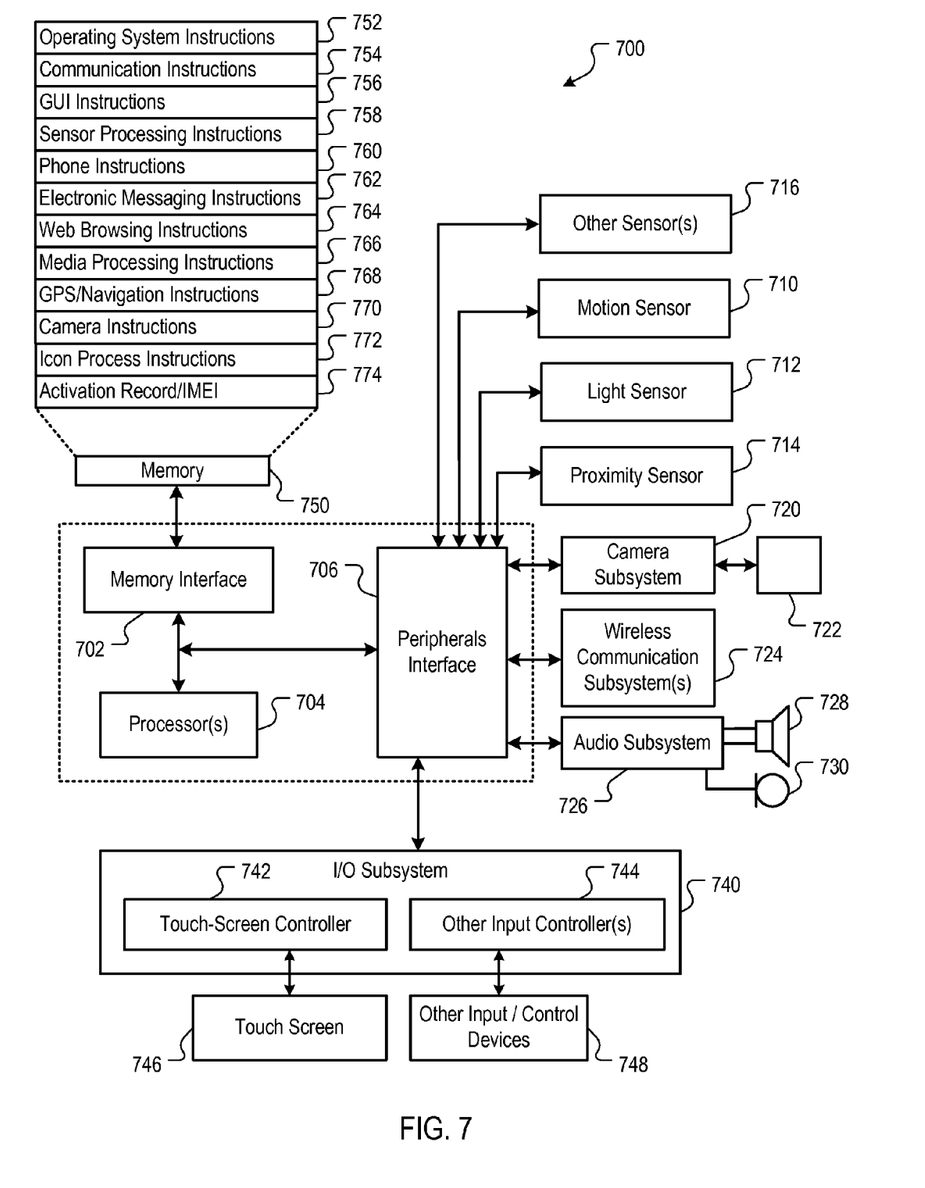
FIG. 7 is a block diagram of an example implementation of the mobile device of FIG. 5.

FIG. 7 is a block diagram 700 of an example implementation of the mobile device 500 of FIG. 5. The mobile device 500 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 500 can be coupled by one or more communication buses or signal lines.

Sensors, devices and subsystems can be coupled to the peripherals interface 706 to facilitate multiple functionalities. For example, a motion sensor 710, a light sensor 712, and a proximity sensor 714 can be coupled to the peripherals interface 706 to facilitate the orientation, lighting and proximity functions described with respect to FIG. 5. Other sensors 716 can also be connected to the peripherals interface 706, such as a positioning system (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device 500 is intended to operate. For example, a mobile device 500 may include communication subsystems 724 designed to operate over a GSM network, a GPRS network, an EDGE network, a Wi-Fi or WiMax network, and a Bluetooth™ network. In particular, the wireless communication subsystems 724 may include hosting protocols such that the device 500 may be configured as a base station for other wireless devices.

An audio subsystem 726 can be coupled to a speaker 728 and a microphone 730 to facilitate voice-enabled functions, such as voice recognition, voice replication, digital recording, and telephony functions.

The I/O subsystem 740 can include a touch screen controller 742 and/or other input controller(s) 744. The touch-screen controller 742 can be coupled to a touch screen 746. The touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration may disengage a lock of the touch screen 746; and a pressing of the button for a second duration that is longer than the first duration may turn power to the mobile device 500 on or off. The user may be able to customize a functionality of one or more of the buttons. The touch screen 746 can, for example, also be used to implement virtual or soft buttons and/or a keypad or keyboard.

In some implementations, the mobile device 500 can present recorded audio and/or video files, such as MP3, AAC, and MPEG files. In some implementations, the mobile device 500 can include the functionality of an MP3 player, such as an iPod™. The mobile device 500 may, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks. The operating system 752 may include instructions for handling basic system services and for performing hardware dependent tasks.

The memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; and/or other icon process instructions 772 to facilitate processes and functions, as described in reference to FIGS. 1-4.

Each of the above identified instructions and applications can correspond to a set of instructions for performing one or more functions described above. These instructions need not be implemented as separate software programs, procedures or modules. The memory 750 can include additional instructions or fewer instructions. Furthermore, various functions of the mobile device 500 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   displaying content in a first user interface of an application on a mobile device;
   receiving an indication to create an icon associated with the content;
   in response to receiving the indication to create the icon:
      rendering at least a portion of the content into the icon;
      ceasing display of the first user interface of the application; and
      displaying the icon on a second user interface of the mobile device, wherein the icon is selectable to display the application, and the second user interface is not a user interface of the application.

2. The method of claim 1, further comprising:
   upon receiving the indication to create the icon from the content, displaying a keyboard on the mobile device.

3. The method of claim 1, further comprising:
   receiving input specifying a name associated with the icon.

4. The method of claim 3, wherein displaying the icon on a user interface of the mobile devices comprises:
   displaying the name in association with the icon on the user interface.

5. The method of claim 1, wherein the content is included on a webpage and the icon is a link to the webpage.

6. The method of claim 1, wherein creating an icon based at least in part on a portion of the content comprises:
   converting at least half of the content into the icon.

7. The method of claim 1, wherein the content comprises at least one of text or an image.

8. The method of claim 1, wherein the indication is displayed proximate to the content.

9. A system comprising:
   a processor; and
   a computer-readable medium coupled to the processor and having instructions stored thereon, which, when executed by the processor, causes the processor to perform operations comprising:
   displaying content in a first user interface of an application on a mobile device;
   receiving an indication to create an icon associated with the content;
   in response to receiving the indication to create the icon:
      rendering at least a portion of the content into the icon;
      ceasing display of the first user interface of the application; and
      displaying the icon on a second user interface of the mobile device, wherein the icon is selectable to display the application, and the second user interface is not a user interface of the application.

10. The system of claim 9, further comprising operations including:
    upon receiving the indication to create the icon from the content, displaying a keyboard on the mobile device.

11. The system of claim 10, further comprising operations including:
    receiving input specifying a name associated with the icon.

12. The system of claim 11, further comprising operations including:
    displaying the name in association with the icon on the user interface.

13. The system of claim 9, wherein the content is included on a webpage and the icon is a link to the webpage.

14. The system of claim 9, further comprising operations including:
    converting at least half of the content into the icon.

15. A non-transitory computer-readable medium including one or more sequences of instructions which, when executed by one or more processors, causes the processors to perform operations comprising:
    displaying content in a first user interface of an application on a mobile device;
    receiving an indication to create an icon associated with the content;
    in response to receiving the indication to create the icon:
       rendering at least a portion of the content into the icon;
       ceasing display of the first user interface of the application; and
       displaying the icon on a second user interface of the mobile device, wherein the icon is selectable to display the application, and the second user interface is not a user interface of the application.

16. The non-transitory computer-readable medium of claim 15, further comprising operations including:
    upon receiving the indication to create the icon from the content, displaying a keyboard on the mobile device.

17. The non-transitory computer-readable medium of claim 16, further comprising operations including:
    receiving input specifying a name associated with the icon.

18. The non-transitory computer-readable medium of claim 17, further comprising operations including:
    displaying the name in association with the icon on the user interface.

19. The-non-transitory computer-readable medium of claim 15, wherein the content is included on a webpage and the icon is a link to the webpage.

20. The non-transitory computer-readable medium of claim 15, further comprising operations including:
    converting at least half of the content into the icon.

21. The method of claim 1, wherein:
    the second user interface of the mobile device includes a second icon,
    the second icon is selectable to display a second application, and
    the second icon includes at least a portion of second content displayed in a user interface of the second application.

22. The method of claim 1, wherein:
    the second user interface of the mobile device includes a second icon,
    the second icon is selectable to display the application, and
    the second icon includes at least a portion of second content displayed in the first user interface of the application.

23. The method of claim 1, wherein the second user interface comprises a home screen of the mobile device.

24. The method of claim 23, wherein the home screen of the mobile device includes one or more icons selectable to display one or more applications other than the application.

25. The method of claim 24, wherein an appearance of the icon selectable to display the application is substantially similar to an appearance of the one or more icons selectable to display the one or more applications other than the application.

26. The method of claim 1, further comprising:
    receiving a selection of the icon on the second user interface of the mobile device; and in response to the selection, displaying a source of the content in the application.

27. The method of claim 26, wherein the source of the content is displayed in the first user interface of the application.

28. The method of claim 2, further comprising concurrently displaying a preview of the icon and the keyboard.

* * * * *